United States Patent [19]

Jun et al.

[11] Patent Number: 4,749,667
[45] Date of Patent: Jun. 7, 1988

[54] ALUMINA - ZIRCONIA CERAMICS REINFORCED WITH SILICON CARBIDE WHISKERS AND METHODS OF MAKING THE SAME

[75] Inventors: Choll K. Jun, Franklin; Edward L. Exner, Troy, both of Mich.

[73] Assignee: Carboloy Inc., Warren, Mich.

[21] Appl. No.: 10,204

[22] Filed: Feb. 3, 1987

[51] Int. Cl.$^4$ .................... C04B 35/56; C04B 35/10; C04B 35/48; C04B 35/80
[52] U.S. Cl. ........................................ 501/89; 501/95; 501/105
[58] Field of Search ................ 501/89, 95, 105

[56] References Cited

U.S. PATENT DOCUMENTS

| | | | |
|---|---|---|---|
| 4,396,724 | 8/1983 | Burden | 501/87 |
| 4,452,906 | 6/1984 | Burden | 501/87 |
| 4,543,345 | 9/1985 | Wei | 501/89 |
| 4,657,877 | 4/1987 | Becher et al. | 501/95 |

OTHER PUBLICATIONS

Claussen et al.; "Whisker-Reinforced Oxide Ceramics", *Journal de Physique* Colloque C1, supplement au N° 2, Tome 47, février 1986, pp. C1-693 to C1-702.
"Impact Strength of Alumina Composites", J. Barta et al., *Ceramic Bulletin*, vol. 51, No. 5 (1972).

*Primary Examiner*—Mark L. Bell
*Attorney, Agent, or Firm*—Hedman, Gibson, Costigan & Hoare

[57] ABSTRACT

Disclosed is a 35 to 45 volume percent silicon carbide whisker reinforced ceramic composite containing alumina and from about 5 to 21 volume percent zirconia which is used to make hard cutting tools having excellent toughness and hardness. Also disclosed are methods of producing the same.

19 Claims, No Drawings

ALUMINA - ZIRCONIA CERAMICS REINFORCED WITH SILICON CARBIDE WHISKERS AND METHODS OF MAKING THE SAME

FIELD OF THE INVENTION

The present invention is directed to ceramic composites containing alumina ($Al_2O_3$) as the matrix material with particulate zirconia ($ZrO_2$) added to the matrix material. Also included in the ceramic composite is silicon carbide (SiC) whiskers. The zirconia and silicon carbide whiskers are present in controlled amounts to provide an SiC whisker reinforced ceramic having improved toughness and hardness.

BACKGROUND OF THE INVENTION

Ceramic compositions employing a substantial amount of alumina ($Al_2O_3$) as a base material are known in the art. Alumina based compositions are advantageous for the production of cutting tools due to their high temperature resistance and wear resistance.

However, such compositions suffer from significant brittleness. Accordingly, much attention has been directed to combining various additives with alumina to improve the hardness and strength of the ceramic composition.

For example, U.S. Pat. No. 4,218,253 discloses the addition of tetragonal zirconium oxide to the aluminum oxide base material to improve toughness.

More recently, U.S. Pat. No. 4,452,906 discloses ceramic compositions of alumina comprised of an essentially homogenous admixture of alumina with certain other refractories including zirconia and tungsten carbide to improve hardness and strength. The '906 patent indicates that in many instances improvement in properties of ceramic compositions containing additives such as zirconia are accompanied by the impairment of other properties.

Accordingly, considerable attention has been focused on maximizing the properties of hardness and toughness of alumina based ceramics. One such approach has been to incorporate into alumina based compositions, silicon carbide whiskers as a reinforcing agent.

U.S. Pat. No. 4,543,345 discloses ceramic composites strengthened with silicon carbide whiskers having a monocrystalline or single crystal structure in an amount of 5 to 60 volume percent. The single crystal SiC whiskers are stated to improve fracture toughness by their ability to absorb cracking energy. Ceramic materials which are stated to exhibit improved hardness in this manner include alumina, mullite ($3Al_2O_3.2SiO_2$) and $B_4C$ as well as cordierite ($2MgO.2Al_2O_3.5SiO_3$).

On the other hand, the '345 patent indicates that the use of silicon carbide whiskers does not improve the toughness of certain ceramic materials including ceramic materials containing both alumina and zirconia.

Applicants have sought to develop a ceramic composite material which is based on alumina having improved toughness and hardness. To this end, applicants have discovered that the addition of specific amounts of particulate zirconia to an alumina based ceramic along with the incorporation of SiC carbide whiskers in specific amounts results in a ceramic composite which surprisingly exhibits the properties of both excellent hardness and toughness which is superior to ceramics known in the art.

It is therefore an object of the invention to provide a ceramic composite which exhibits excellent wear resistance, fracture toughness and hardness.

It is another object of the invention to provide a method of making a ceramic composition containing alumina, zirconia and reinforced with silicon carbide whiskers.

SUMMARY OF THE INVENTION

The present invention is directed to a silicon carbide whisker reinforced ceramic composite comprising a matrix of alumina with zirconia in the monoclinic or tetragonal phase in an effective amount sufficient to obtain high hardness and fracture toughness wherein the silicon carbide whiskers are present in an amount of between about 35 and 45 volume percent, especially about 35 to about 40 volume percent. The silicon carbide whiskers have a single crystal structure in the alpha and/or beta phase and generally have a diameter of between about 0.3 and 2.0 $\mu m$ and a length between about 2 and 40 $\mu m$ preferably 5 to 25 $\mu m$.

In a preferred form of the present invention, the composite contains between about 5 and 21 volume percent of zirconia, most preferably between about 8 and 17 volume percent of zirconia.

In another aspect of the invention, the alumina based ceramic composite is produced by forming a mixture of the alumina, zirconia and silicon carbide whiskers and then hot pressing the mixture at a temperature of about 1700° C. to about 1800° C., preferably about 1750° C. at a pressure of at least about 2,000 psi, preferably about 2,500 psi to about 4,000 psi for about 30 to about 180 minutes, preferably about 45 to 90 minutes under vacumm conditions, preferably less than 300 $\mu m$ of mercury or in an inert atmosphere (e.g. argon). The resulting product has a density of at least 94% and up to 99% or greater of the theoretical density.

DETAILED DESCRIPTION OF THE INVENTION

The zirconia employed in the present invention is unstabilized or only partially stabilized so that the zirconia is in the monoclinic or tetragonal phase. Zirconia which is fully stabilized to the cubic phase does not achieve the hardness and toughness charactertistics which are achieved using unstabilized or only partially stabilized form. Accordingly, the present ceramic material does not contain major amounts of stabilization promoters such as yttria, calcium and magnesia. Especially good hardness and toughness characteristics are obtained by using an amount of zirconia in the range of about 5 to 21 volume percent, most preferably in the range of about 8 to 17 volume percent.

The silicon carbide whiskers have a single crystal structure in the alpha and/or beta phase. The amount of silicon carbide whiskers employed in the present invention appears to be at least partially dependent on the amount of zirconia which is used. If zirconia is used in the most preferred range of from about 8 to 17 volume percent, an especially good balance of hardness and toughness for the ceramic composite is obtained when the volume percent of the SiC whiskers is in the range of about 35 to about 40 volume percent.

The ceramic composite is generally prepared by blending, in distilled water, the alumina, zirconia and silicon whiskers in a ball mill to obtain a homogeneous slurry. The slurry is then air dried in an oven and then screened. The dried material is hot pressed in a graphite mold to a temperature of about 1750° C. and held for about 60 minutes at about 3,000 psi in a vacuum of less than 300 μm of mercury or in an inert atmosphere.

The following examples are for illustrative purposes only and are not meant to limit the invention encompassed by the claims forming part of the application.

EXAMPLE 1

A mixture of 9.8 volume percent of zirconia (Harshaw Electronic Grade), 35 volume percent of silicon carbide whisker (Tokai Tokawhisker manufactured by the Tokai Carbon Co., Ltd.) and the balance alumina (Alcoa A-16SG) was blended in a ball mill until a homogenous slurry was obtained (e.g., about 6 hours). The slurry was then air dried in an oven and then screened.

The dried material was hot pressed in a graphite mold at a temperature of 1750° C. for 60 minutes at 3,000 psi under vacuum conditions (i.e., about 100 μm of mercury).

The hot pressed material was measured for density using Archimede's Principle. The porosity was rated using ASTM standard B-276-54. Vicker's Hardness and Fracture Toughness ($K_{IC}$) were measured using an 18Kg indenting load. The results are shown in Table 1:

TABLE 1

| | Density g/cc | Porosity | Hardness VHN (GPa) | Toughness KIC (MPa · m$^{\frac{1}{2}}$) |
| --- | --- | --- | --- | --- |
| Sample 1 | 3.900 | A0-1 | 21.29 | 7.88 |

EXAMPLE 2-5

Three samples of ceramic material and one comparative sample (A) having the compositions shown in Table 2 were prepared and tested in the same manner as in Example 1. The results are shown in Table 2:

TABLE 2

| | COMPOSITION (% by volume) | | | PROPERTIES | | | |
| --- | --- | --- | --- | --- | --- | --- | --- |
| | $Al_2O_3$ | $ZrO_2$ | SiC (Whiskers) | Density g/cc | Porosity | Hardness VHN (GPa) | Toughness KIC (MPa · m$^{\frac{1}{2}}$) |
| Sample | | | | | | | |
| 2 | 60.0 | 5.0 | 35 | 3.806 | A0-2 | 22.73 | 7.15 |
| 3 | 55.3 | 14.6 | 35 | 3.995 | A0-1 | 20.19 | 8.09 |
| 4 | 45.5 | 19.5 | 35 | 4.081 | A2-3 | 18.79 | 8.53 |
| Comparative Samples | | | | | | | |
| A | 65 | 0 | 35 | 3.724 | A1-2 | 22.73 | 5.55 |

As can be seen from Tables 1 and 2, ceramic composites containing amounts of zirconia and silicon carbide whiskers in accordance with the present invention, especially samples 1 and 3, exhibited both excellent hardness and toughness as compared with the comparative sample containing no zirconia.

EXAMPLES 5-7

Three samples of ceramic material in accordance with the present invention and two comparative samples (B and C) having the compositions shown in Table 3 were prepared and tested in the same manner as in Example 1. The results are shown in Table 3.

TABLE 3

| | COMPOSITION (% by volume) | | | PROPERTIES | | | |
| --- | --- | --- | --- | --- | --- | --- | --- |
| | $Al_2O_3$ | $ZrO_2$ | SiC (Whiskers) | Density g/cc | Porosity* | Hardness VHN (GPa) | Toughness KIC (MPA · m$^{\frac{1}{2}}$) |
| Sample | | | | | | | |
| 5 | 51.0 | 9.0 | 40.0 | 3.84 | A3-4 | 22.11 | 7.52 |
| 6 | 46.5 | 13.5 | 40.0 | 3.93 | A0-2 | 21.20 | 7.96 |
| 7 | 42.0 | 18.0 | 40.0 | 4.10 | A2-3 | 19.53 | 8.27 |
| Comparative Samples | | | | | | | |
| B | 60.0 | 0.0 | 40.0 | 3.67 | A0-2 | 23.24 | 5.58 |
| C | 55.5 | 4.5 | 40.0 | 3.75 | A1-3 | 22.85 | 6.67 |

As shown in Table 3, the comparative samples with amounts of zirconia below that required in the present invention exhibited high hardness but unacceptable toughness. On the other hand, samples 5-7, especially samples 5 and 6 exhibited both excellent hardness and toughness.

COMPARATIVE EXAMPLES

Four comparative samples (D-G) having the compositions shown in Table 4 were prepared and tested in the same manner as Example 1. The results are shown in Table 4:

TABLE 4

| Comparative Sample | COMPOSITION (% by volume) | | | PROPERTIES | | | |
| --- | --- | --- | --- | --- | --- | --- | --- |
| | $Al_2O_3$ | $ZrO_2$ | SiC (Whiskers) | Density g/cc | Porosity | Hardness VHN (GPa) | Toughness KIC (MPa · m$^{\frac{1}{2}}$) |
| D | 69.4 | 5.6 | 25 | 3.906 | A0-1 | 20.19 | 6.72 |
| E | 63.8 | 11.3 | 25 | 4.002 | A0-1 | 19.98 | 7.74 |
| F | 58.1 | 16.9 | 25 | 4.113 | A2-3 | 18.79 | 7.90 |
| G | 52.5 | 22.5 | 25 | 4.217 | A3-4 | 17.70 | 8.30 |

As shown in Table 4, the comparative samples containing amounts of SiC whiskers below that required in the present invention do not achieve both excellent hardness and toughness. More specifically, comparative sample D shows good hardness but is below a satisfactory level of toughness. On the other hand, while the toughness characteristics of comparative samples E-G are good, they lack adequate hardness.

What is claimed is:

1. A silicon carbide reinforced ceramic composite comprising a matrix of alumina with at least about 5 volume percent zirconia in the monoclinic or tetragonal phase in an effective amount sufficient to increase hardness and fracture toughness and from about 35 to about 45 volume percent of silicon carbide whiskers.

2. The composite of claim 1 wherein the amount of zirconia is from about 5 to about 21 volume percent.

3. The composite of claim 2 wherein the amount of zirconia is from about 8 to about 17 volume percent.

4. The composite of claim 1 wherein the amount of silicon carbide whiskers is from about 35 to about 40 volume percent.

5. The composite of claim 2 wherein the amount of silicon carbide whiskers is from about 35 to about 40 volume percent.

6. The composite of claim 3 wherein the amount of silicon carbide whiskers is from about 35 to about 40 volume percent.

7. The composite of claim 1 wherein the diameter of silicon carbide whiskers is from about 0.3 to about 2.0 $\mu$m and the length is from about 2 to about 40 $\mu$m.

8. The composite of claim 7 wherein the length of the silicon carbide whiskers is from about 5 to about 25 $\mu$m.

9. A silicon carbide whisker reinforced ceramic composite comprising a matrix of alumina with zirconia in a monoclinic or a tetragonal phase in an amount of about 8 to about 17 volume percent and from about 35 to about 45 volume percent of silicon carbide whiskers, said silicon carbide whiskers having a diameter of from about 0.3 to about 2.0 $\mu$m and a length of from about 2 to about 40 $\mu$m.

10. The composite of claim 9 wherein the amount of silicon carbide whiskers is from about 35 to about 40 volume percent.

11. A method of forming a ceramic composite having excellent fracture toughness and hardness comprising combining alumina, from about 5 to 21 volume percent of monoclinic or tetragonal phase zirconia and from about 35 to 40 volume percent of silicon carbide whiskers to form a mixture, hot pressing said mixture at a temperature of from about 1700° to about 1800° C. at a pressure from about at least 2,000 psi.

12. The method of claim 11 wherein the pressure is from about 2,500 to 4,000 psi.

13. The method of claim 12 wherein the temperature is about 1750° C. and the pressure is about 3,000 psi.

14. The method of claim 11 wherein the amount of zirconia is from about 8 to about 17 volume percent.

15. The method of claim 14 wherein the amount of silicon carbide whisker is from about 35 to about 40 volume percent.

16. The method of claim 11 wherein the diameter of the silicon carbide whiskers is from about 0.3 to about 2.0 $\mu$m and the length is from about 2 to about 40 $\mu$m.

17. The method of claim 16 wherein the length of the silicon carbide whiskers is from about 5 to about 25 $\mu$m.

18. The method of claim 11 wherein the amount of zirconia is from about 8 to 17 volume percent, said silicon carbide whiskers having a diameter of from about 0.3 to 2.0 $\mu$m and a length of from about 2 to 40 $\mu$m.

19. The method of claim 18 wherein the amount of silicon carbide whiskers is from about 35 to 40 volume percent.

* * * * *

UNITED STATES PATENT AND TRADEMARK OFFICE
CERTIFICATE OF CORRECTION

PATENT NO. : 4,749,667
DATED : June 7, 1988
INVENTOR(S) : Choll K. Jun et al.

It is certified that error appears in the above-identified patent and that said Letters Patent is hereby corrected as shown below:

Claim 11, line 5, cancel "40" and insert -- 45 --.

Signed and Sealed this

Sixteenth Day of January, 1990

*Attest:*

JEFFREY M. SAMUELS

*Attesting Officer*     *Acting Commissioner of Patents and Trademarks*